2,893,952
SWEETENING OF HYDROCARBON DISTILLATES

Joseph A. Chenicek, Prairie View, Ill., assignor, by mesne assignments, to Universal Oil Products Company, Des Plaines, Ill., a corporation of Delaware No Drawing. Application October 31, 1957
Serial No. 693,561

7 Claims. (Cl. 208—204)

This application is a continuation-in-part of copending application Ser. No. 416,431, filed March 15, 1954, now abandoned and relates to the treatment of hydrocarbon distillates and more particularly to a novel method of effecting sweetening of sour hydrocarbon distillates.

One method of removing mercaptans from a hydrocarbon distillate comprises treating the hydrocarbon distillate with an alkali metal hydroxide solution and particularly sodium hydroxide solution, potassium hydroxide solution, etc. A modification of this process includes the use of a solubilizer along with the alkali metal hydroxide solution. These and other methods are satisfactory for removing a major proportion of the mercaptans from the hydrocarbon distillate. However, the hydrocarbon distillate still contains mercaptans and is not sweet to the Doctor test. A recent process effects the final sweetening of the distillate by incorporating therein a phenylene diamine compound.

In accordance with the present invention, the final sweetening of the hydrocarbon distillate is effected by incorporating therein a compound of different chemical structure and by means of a different chemical mechanism than heretofore utilized for this purpose.

In one embodiment the present invention relates to a method of sweetening a sour hydrocarbon distillate which comprises incorporating in said distillate and reacting with the mercaptans contained therein a compound having the general formula:

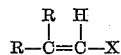

where R is selected from the group consisting of hydrogen, alkyl, aryl, aralkyl, alkaryl and cycloalkyl, and X is selected from the group consisting of

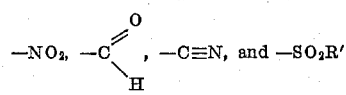

and R' is selected from a group consisting of hydrogen, alkyl, aryl, aralkyl, alkaryl, cycloalkyl, hydroxy and alkoxy.

Referring to the above formula, where X is a —NO₂, the compound will comprise a nitroalkylene, nitrostyrene, etc. compound. Nitroalkylene compounds include nitroethylene, 1-nitro-1-propene, 1-nitro-1-butene, 1-nitro-1-pentene, 1-nitro-1-hexene, 1-nitro-1-heptene, 1-nitro-1-octene, etc. Nitrostyrene having the configuration set forth above is omega-nitrostyrene and is a preferred compound for use in accordance with the present invention. Other similar nitro compounds include omega-nitroallylbenzene, omega-nitrophenylbutadiene, etc.

When X in the above formula is a

the compound will be an unsaturated aldehyde including acrolein, crotonaldehyde, cinnamaldehyde, etc.

When X in the above formula is a —C≡N, the compound will comprise acrylonitrile, methylacrylonitrile, ethylacrylonitrile, propylacrylonitrile, butylacrylonitrile, etc. When X is a

group, the compound will comprise an unsaturated sulfone including, for example, compounds as vinylsulfone, beta-methylvinyl sulfone, beta-dimethylvinyl sulfone, beta-ethylvinyl sulfone, beta-propylvinyl sulfone, beta-butylvinyl sulfone, beta-phenylvinyl sulfone, beta-tolylvinyl sulfone, beta-xylylvinyl sulfone, vinylmethyl sulfone, vinylethyl sulfone, vinylpropyl sulfone, vinylbutyl sulfone, beta-methylvinyl-methyl sulfone, beta-di-methylvinyl-methyl sulfone, beta-methylvinyl-ethyl sulfone, beta-methylvinyl-propyl sulfone, beta-methylvinyl-butyl sulfone, etc.

It is understood that the various compounds which may be utilized for reacting with the mercaptans in the hydrocarbon distillate are not necessarily equivalent and that some may be more effective than others in certain hydrocarbon distillates. It also is understood that a mixture of 2 or more of these compounds may be employed.

In effecting sweetening of the sour distillate, the compound reacts with the mercaptans in the sour distillate. It is believed that the reaction proceeds as illustrated in the following equation, although it is not intended that applicant shall be limited to this specific explanation.

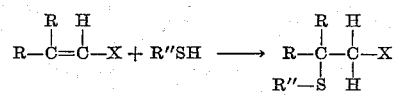

In the above equation R represents the groups as hereinbefore set forth. R″ represents a hydrocarbon or substituted hydrocarbon group corresponding to the mercaptan or mercapto compound present in the hydrocarbon distillate.

Another advantage to the novel process of the present invention is that the reaction product possesses antioxidant properties and, therefore, will improve the stability of the hydrocarbon distillate in retarding and/or preventing gum formation, discoloration, etc.

In another embodiment, the novel method of the present invention may be utilized in conjunction with the use of a phenylene diamine compound. The phenylene diamine compound effects final sweetening very readily in most cases. However, in some cases, the sweetening is accompanied by the formation of peroxides and gum. In such cases, the use of the compound of the present invention along with the phenylene diamine compound will serve to obtain the desired sweetening without formation of undesirable peroxides and gums. In other cases, the use of both the compound of the present invention and the phenylene diamine will serve to obtain the desired sweetening in distillates which are not readily sweetened by phenylene diamine alone. Of the phenylene diamines, N,N′-di-sec-butyl-p-phenylene diamine is preferred. Other phenylene diamine compounds include p-phenylene diamines in which the alkyl substituents attached to the nitrogen atoms each contain from 1 to about 12 carbon atoms. When utilizing the phenylene diamine compound, it is necessary that oxygen is present, and the oxygen may be dissolved in the hydrocarbon distillate or, if an insufficient amount is present in this manner, air may be added to the hydrocarbon distillate in any suitable manner. The phenylene diamine compound generally is utilized in a concentration of from about 0.0001% to about 0.5% by weight and also serves as an antioxidant in the hydrocarbon distillate.

The sweetening of the hydrocarbon distillate may be effected in any suitable manner. In one embodiment, the sweetening is effected in the presence of an alkali metal hydroxide. When the hydrocarbon distillate is first treated with an alkali metal hydroxide to remove a major proportion of the mercaptan, the treated hydrocarbon distillate will contain a small amount of entrained alkali metal hydroxide. In many cases this small amount of alkali metal hydroxide is sufficient for the purpose and the sweetening with the compound of the present invention is effected in the presence thereof. In another method, it may be desirable to add alkali metal hydroxide to the hydrocarbon distillate before or after the addition of the compound of the present invention. In place or in addition to the alkali metal hydroxide, organic amine compounds may be utilized including, for example, piperidine, etc. When the phenylene diamine compound is utilized, air may be bubbled through the hydrocarbon distillate containing the additives to thereby insure intimate mixing and to accelerate the sweetening.

In effecting the sweetening with the compound of the present invention, it generally is preferred to obtain intimate mixing of the compound of the present invention with the hydrocarbon distillate. In one method, the compound of the present invention is commingled with the hydrocarbon distillate and the resultant mixture is passed through suitable mixing devices such as durion mixers, orifice mixers, etc. The resultant mixture then is introduced into a storage tank which, when desired, may contain suitable stirring means such as mixing paddles, etc. to effect further mixing. The sweetening is readily effected at atmospheric temperature, although elevated temperatures up to 220° F. or more may be utilized when desired. The amount of compound of the present invention to be employed will depend upon the mercaptan content of the hydrocarbon distillate. At least one molecular proportion of compound of the present invention per molecular proportion of mercaptan should be employed. Usually it is desired to employ at least a slight excess of compound of the present invention in order to insure complete reaction and thus may range up to 20 or more molecular proportions of compound of the present invention per molecular proportion of mercaptan. In general, the concentration of compound of the present invention may range from 0.0001% to 2% or more by weight of the hydrocarbon distillate and preferably in a concentration of from about 0.001% to about 0.5% by weight.

The process of the present invention may be used to effect sweetening of any sour hydrocarbon distillate and is particularly applicable to the treatment of gasoline and more particularly cracked gasoline. However, it may be utilized for the treatment of straight run gasoline, mixtures of cracked and straight run gasoline, cracked and/or straight run higher boiling distillates including kerosene, diesel oil, fuel oil, gas oil, etc.

As hereinbefore set forth, the compound of the present invention may be utilized along with phenylene diamine compound. It is understood that the compound of the present invention also may be utilized along with other additives which are added to the hydrocarbon distillate for specific purposes including other antioxidants, metal deactivators, dyes, etc. When desired the compound of the present invention may be utilized in a suitable solvent or it may comprise the solvent for other additives and thus serve a dual function. As an example, N,N'-di-sec-butyl-p-phenylene diamine may be prepared as a solution in acrylonitrile, and this solution is added to the hydrocarbon distillate.

The following examples are introduced to illustrate further the novelty and utility of the present invention but not with the intention of unduly limiting the same.

Example I

The gasoline used in this example was a thermally cracked gasoline having an original mercaptan sulfur content of 0.005% by weight, which was increased to 0.03% by the addition of n-hexyl mercaptan. Omega-nitrostyrene was added to a sample of the gasoline in a molar ratio of 10:1 to mercaptan. After suitable mixing and a residence time of 24 hours at 68° F., the mercaptan content of the gasoline was decreased 73%.

Example II

Sweetening was effected with omega-nitrostyrene in the same manner as described in Example I except that a temperature of 212° F. was employed. When using the higher temperature, the mercaptan content of the gasoline was decreased 92% after 20 minutes.

Example III

Sweetening with omega-nitrostyrene in the same manner described in Example I except that the sweetening was effected in the presence of sodium hydroxide. The molar ratio of omega-nitrostyrene to mercaptan was 5:1. After 24 hours, the mercaptan content of the gasoline was decreased 91%.

Example IV

The compound used in this example was acrolein. When added in a molar proportion of 5:1 to mercaptan, acrolein served to decrease the mercaptan content of the gasoline 66% after 24 hours at 68° F.

Example V

The compound used in this example is acrylonitrile. It is added in a molar ratio of 7:1 to sour kerosene and is reacted in the presence of piperidine at a temperature of 150° F. This serves to decrease the mercaptan content of the kerosene.

Example VI

The compound used in this example is vinylsulfone. It is added in a molar ratio of 8:1 to sour cracked gasoline and is reacted in the presence of potassium hydroxide at a temperature of 175° F. This serves to decrease the mercaptan content of the gasoline.

I claim as my invention:

1. A method of sweetening a sour hydrocarbon distillate containing mercaptans which comprises incorporating in said distillate and reacting with the mercaptans contained therein from about 0.0001% to about 2% by weight of a compound having the general formula:

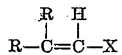

where R is selected from the group consisting of hydrogen, alkyl, aryl, aralkyl, alkaryl and cycloalkyl, and X is selected from the group consisting of

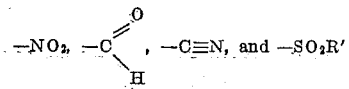

and R' is selected from a group consisting of hydrogen, alkyl, aryl, aralkyl, alkaryl, cycloalkyl, hydroxy and alkoxy, effecting said reaction at a temperature of from about atmospheric to about 220° F. and recovering a sweetened distillate.

2. The method of claim 1 further characterized in that said reacting is effected in the presence of an alkali metal hydroxide.

3. The process of claim 1 further characterized in that said reacting is effected in the presence of a phenylene diamine compound.

4. A method of sweetening a gasoline containing mercaptans which comprises incorporating in said gasoline and reacting with the mercaptans contained therein from about 0.0001% to about 2% by weight of omega-nitrostyrene, effecting said reaction at a temperature of from about atmospheric to about 220° F. in the presence of sodium hydroxide and recovering a sweetened gasoline.

5. A method of sweetening a gasoline containing mercaptans which comprises incorporating in said gasoline and reacting with the mercaptans contained therein from about 0.0001% to about 2% by weight of acrolein, effecting said reaction at a temperature of from about atmospheric to about 220° F. in the presence of sodium hydroxide and recovering a sweetened gasoline.

6. A method of sweetening a gasoline containing mercaptans which comprises incorporating in said gasoline and reacting with the mercaptans contained therein from about 0.0001% to about 2% by weight of acrylonitrile, effecting said reaction at a temperature of from about atmospheric to about 220° F. in the presence of sodium hydroxide and recovering a sweetened gasoline.

7. A method of sweetening a gasoline containing mercaptans which comprises incorporating in said gasoline and reacting with the mercaptans contained therein from about 0.0001% to about 2% by weight of vinyl sulfone, effecting said reaction at a temperature of from about atmospheric to about 220° F. in the presence of sodium hydroxide and recovering a sweetened gasoline.

References Cited in the file of this patent

UNITED STATES PATENTS

| Number | Name | Date |
|---|---|---|
| 1,601,215 | Johansen | Sept. 28, 1926 |
| 2,033,877 | Burk | Mar. 10, 1936 |
| 2,176,747 | Schneider et al. | Oct. 17, 1939 |
| 2,354,646 | Bell | Aug. 1, 1944 |
| 2,357,344 | Morris et al. | Sept. 5, 1944 |
| 2,415,817 | Fetterly | Feb. 18, 1947 |
| 2,432,301 | Fetterly | Dec. 9, 1947 |
| 2,492,334 | Thompson | Dec. 27, 1949 |
| 2,496,444 | Cook | Feb. 7, 1950 |
| 2,616,832 | Browder | Nov. 4, 1952 |
| 2,684,943 | Baker | July 27, 1954 |